Patented Aug. 11, 1953

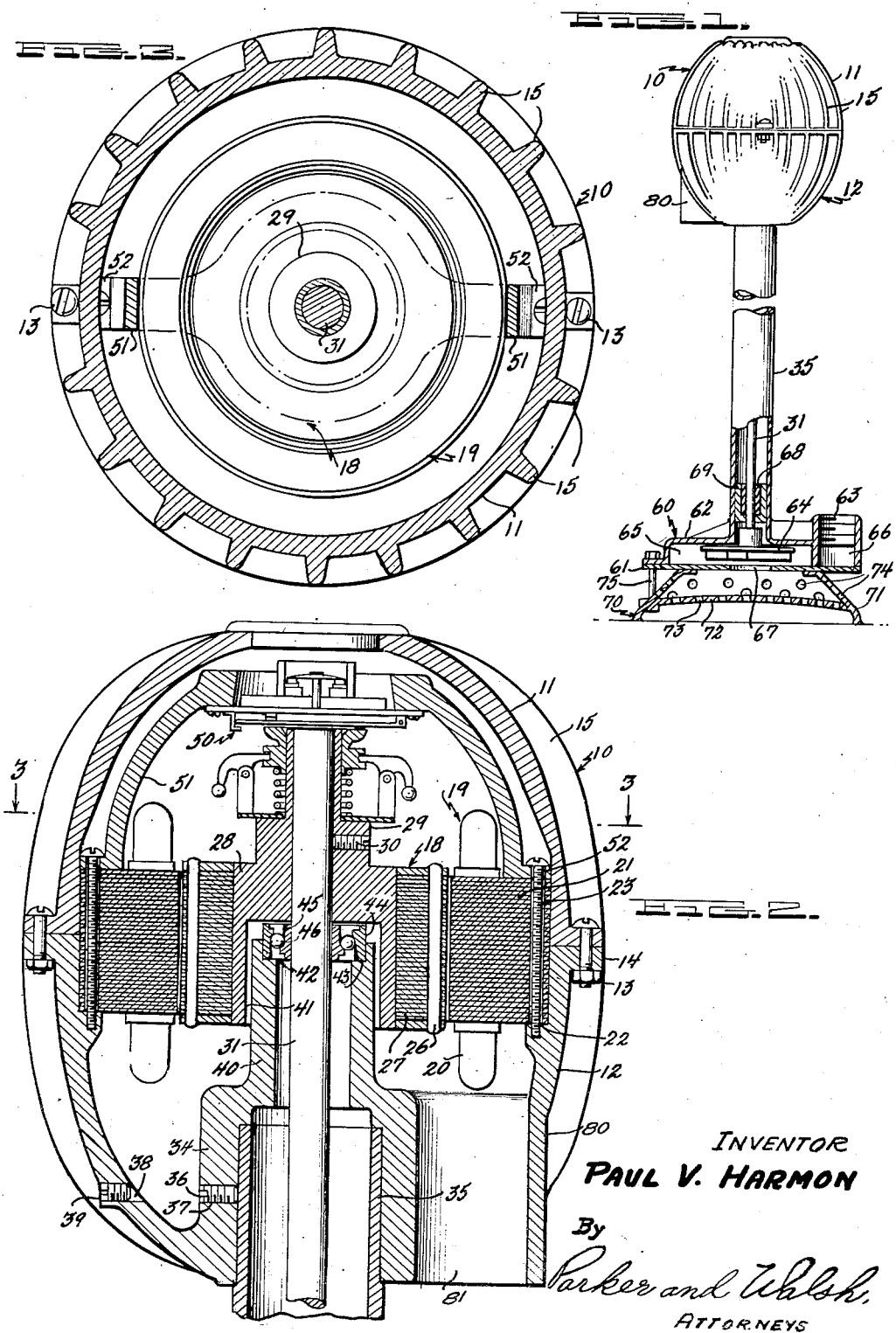

2,648,790

UNITED STATES PATENT OFFICE 2,648,790

ELECTRIC MOTOR-DRIVEN UNIT

Paul V. Harmon, Nashville, Tenn., assignor to Precision Parts Corporation, Nashville, Tenn., a corporation of Tennessee Application May 26, 1950, Serial No. 164,490

3 Claims. (Cl. 310—66)

This invention relates to electric motor driven units, and more particularly to a sump pump structure.

In the manufacture of sump pumps, it is the common practice to employ conventional motor structures supported by suitable columns a substantial distance above the pumping units, the latter being submerged in water-filled sumps and it being necessary to arrange the motors a substantial distance above the pumping units for obvious reasons. Conventional electric motors are provided with rotors mounted on shafts supported in aligned bearings adjacent the ends of the motor casings. The motor shaft is usually coupled to and in alignment with a depending shaft carrying a centrifugal or other rotary pump at its other end. The depending shaft is commonly supported in one or more bearings.

A pump of this character, therefore, commonly employs three or more shaft bearings and the proper functioning of the apparatus requires that these bearings be maintained accurately in alignment with each other. Because of the fact that the lowermost bearing of the unit, that is, the bearing closest to the pumping unit, is subjected to the greatest wear, the depending shafts after a few months' use develop appreciable play with respect to their lower bearings. This causes the depending shaft to rotate out-of-true, and the supporting of the motor shaft in two spaced bearings causes a whipping of the shaft between these bearings with highly destructive vibrational effects.

An important object of the present invention is to provide an electric motor driven unit, and more specifically a sump pump structure, wherein substantial economy in manufacture is effected by reducing the number of bearings employed and wherein the use of fewer bearings, arranged in a particular manner, increases the efficiency of the apparatus and reduces and in fact substantially eliminates the destructive effects of vibration resulting from the wearing of the lowermost bearing, thus increasing the periods of use of the apparatus without repairs or replacements.

A further object is to provide a structure of the character referred to wherein a single bearing is employed for the motor and this bearing is arranged substantially centrally of the length of the motor whereby any out-of-true running of the shaft of the pump, incident to the wearing of the lowermost bearing, is accommodated by the single motor bearing without the introduction of appreciable vibration.

A further object is to provide such a construction which lends itself very readily to the use of a single shaft instead of a separate pump shaft connected with or coupled to the shaft of the motor, thus permitting additional economies in manufacture.

A further object is to provide such a construction wherein a modified motor structure is provided, using relatively light aluminum or similar parts forming the connecting means for the rotor of the motor and the shaft and for the mounting of the shaft in the single motor bearing structure employed.

Other objects and advantages of the present invention will become apparent during the course of the following description.

In the drawing, I have shown one embodiment of the invention. In this showing,

Figure 1 is a side elevation of the entire apparatus, parts being broken away and parts being shown in section, Figure 2 is a central vertical sectional view through the motor structure and associated elements, parts being shown in elevation, and Figure 3 is a transverse sectional view on line 3—3 of Figure 2.

Referring to the drawing, the numeral 10 designates a motor housing as a whole comprising upper and lower complementary sections 11 and 12 coupled by bolts 13 passing through flanges 14 on the housing sections 11 and 12. These housing sections preferably are provided with radiating fins 15 to assist in dissipating heat generated in the motor. The housing sections may be conveniently and economically formed of aluminum castings.

Within the housing 10 is arranged a motor having rotor and stator sections 18 and 19 respectively, the latter of which is provided with windings 20 and the usual laminations 21 seating upon a shoulder 22 formed in the lower housing section 12. The laminations are secured in position by screws 23 which serve an additional purpose referred to below, and forming together with other features of the present construction, and subject matter of my co-pending application, Serial No. 164,489, filed May 26, 1950.

The rotor 18 includes the usual windings 26 and laminations 27, the latter of which are fixed to a hub 28 which conveniently and preferably is formed of cast aluminum. This hub has an unstanding flange 29 fixed by a set screw 30 to a shaft 31 forming the single shaft of the apparatus, as will become apparent, and preferably formed of stainless steel. The shafting of this material of extreme accuracy is readily obtainable and is preferably employed in the present apparatus.

The casing section 12 is provided in the bottom thereof with an inwardly extending axial sleeve portion 34 in which is seated the upper end of a stationary tube or column 35 connected to the pumping mechanism to be described. This column is secured in position by a set screw 36 threaded through the sleeve 34. For the purpose of providing access to the opening 37 in which the screw 36 is arranged, the casing 12 is drilled and tapped to provide an opening 38 normally closed by a plug 39.

The sleeve 34 is provided with an upwardly extending coaxial portion of reduced diameter indicated by the numeral 40 and this sleeve portion extends upwardly into an axial recess 41 formed in the hub 28. A combined axial and thrust bearing 42 supports the shaft 31 with respect to the sleeve portion 40, the latter being recessed as at 43 to receive the outer race 44 of the bearing. The inner race 45 is fixed on the shaft 31 and the usual ball bearings 46 are arranged between the two races. It will be noted that the bearing 42 is arranged substantially midway of the height of the motor, and this arrangement is preferred for a reason which will become apparent.

Suitable control mechanism for the motor, indicated as a whole by the numeral 50, is arranged within the casing section 11 above the motor. These control elements form no part of the present invention but form generally a part of the invention disclosed and claimed in my co-pending application identified above. The control units for the motor are carried by an arcuate yoke 51, the lower ends of which are provided with outwardly extending flanges 52 through which the screws 23 extend as shown in Figure 2, these screws serving to fix the stator 19 in position and also to fix in position the yoke 51 and the elements carried thereby.

The lower end of the tube or column 35 is connected to a sump pump indicated as a whole by the numeral 60. This pump comprises a bottom plate 61 and an upper housing 62 having an outlet 63. In the present instance, the pump per se is shown as being of the centrifugal type and is indicated by the numeral 64. The plate 61 and housing 62 form a pump chamber 65 in which the pump 64 is arranged. The chamber 65 communicates with the outlet 63 through a passage partly indicated by the numeral 66, and an inlet opening for the pump chamber, indicated by the numeral 67 is formed in the center of the plate 61. The pump 64 is connected to the lower end of the shaft 31, and this shaft, near the bottom of the tube 35, rotates in a preferably self-lubricating bearing 68 which may be of the impregnated bronze type, mounted in a carrier 69.

The pump is mounted on and supported by a strainer unit indicated as a whole by the numeral 70. This unit comprises a preferably frusto-conical body 71 having a bottom wall 72. This wall is perforated as at 73 while the body 71, above the bottom wall 72, is perforated as at 74. The plate 61 seats on the top of the body 71, and the housing 62, plate 61 and body 71 are secured together by suitable bolts 75.

The present construction is particularly intended for use as a sump pump, and devices of this character, as is well known, have their motors controlled by suitable floats which operate to close a circuit through the motor when the level of the liquid to be pumped rises to a predetermined point, the float mechanism opening the motor circuit when the liquid level has been pumped down to a predetermined point. The float mechanism forms no part of the present invention and accordingly has been omitted. It may be pointed out, however, that the casing section 12 is provided in the bottom thereof and offset from the tube 30 with an integral sleeve portion 80 having an opening 81 therethrough for the reception of the switch mechanism to be controlled by the float or floats.

Operation

The apparatus is placed in accordance with the usual practice with its lower end disposed within a sump or other recess or container from which liquid is to be pumped, the liquid flowing into the interior of the strainers through openings or perforations 73 and 74 and thence into the pump chamber 65 through opening 67. The motor is subject to energization by the float control switch arranged in the opening 81 which, as stated, need not be shown or described since it forms no part of the present invention. When the liquid level rises to the predetermined point, the motor will be energized and will be subject to control by the elements generally designated by the numeral 50, these elements including a starter winding switch and a governor for controlling such switch, and an overload switch, all of which elements are carried by the yoke 51 as described in my co-pending application referred to.

The preferably single shaft 31 is connected to the rotor 18 to be driven thereby and thus rotate the pump 64 to pump the liquid in the usual manner, the shaft being mounted for rotation in the bearings 42 and 68 and being supported by the bearing 42 which is also a thrust bearing.

The use of only two bearings permits the bearings to be much more easily aligned than when three or more bearings are employed, substantially greater accuracy in manufacture being required with a multiplicity of bearings. The two bearings employed with the present construction readily may be made sufficiently heavy duty in character adequately to take care of the loads and wear to which they will be subjected in the operation of the apparatus.

As stated, the greatest wear takes place in the lowermost bearing in an apparatus of this character. Because of the nature of the apparatus, it is far more practicable and economically feasible to use a self-lubricating bearing of the type referred to, as the bearing 68. If ball or roller bearings were employed in place of the bearing 68, it would be necessary to pack the shaft 31 to seal such bearing against water, and this would not only introduce greater friction in the apparatus, but also would materially increase the cost, and it would be necessary to provide packing of a type which is capable of being tightened to constantly prevent the seepage of water along the shaft to the lower bearing. The self-lubricating bearing of the type illustrated accordingly is far more practicable as well as more economically feasible, but necessarily this bearing wears and develops play somewhat more rapidly than the upper bearing 42. Obviously, it is wholly practicable to employ a ball or roller bearing at this point.

As previously stated, the upper bearing 42 is arranged substantially centrally of the height of the motor. As wear occurs in the lower bearing 68, with conventional constructions, the out-oftrue running of the lower end of the shaft adjacent the motor causes a whipping action in the shaft resulting in the generation of destructive vibrational forces. With the present construction, the shaft merely rocks the inner race of the bearing 42 to a negligible extent, the shaft being free to flex to the slight extent caused by the wearing of the lower bearing without generating appreciable vibration. The rotor of the motor partakes of this rocking action, but the extent of such action is wholly negligible.

Accordingly, it will be apparent that the present construction not only provides a sump pump or similar structure which can be more economically manufactured, but which is far superior to conventional constructions employing a multiplicity of bearings. In practice, it has been found that the present apparatus will operate over much longer periods of time without service than is true of other constructions. Moreover, the destructive effects of vibration are eliminated together with the noise caused thereby, and accordingly, the apparatus is quiet in operation and remains quiet over long periods of time. Essentially, the invention consists in supporting the rotor of an electric motor in a single bearing substantially centrally thereof and supporting a shaft extending substantially to a remote point to drive the pump or other structure and supporting the shaft solely by the bearing of the motor and a single bearing arranged adjacent the device to be driven.

I claim:

1. An electric motor driven unit comprising a motor comprising a stator and a rotor, an axial hub carrying said rotor, a unit adapted to be driven by said motor and arranged a substantial distance therebelow, a tube fixing said unit with respect to the casing of said motor, said hub being axially recessed in its lower end, and two remotely spaced bearing structures forming the sole supporting means for said shaft, one of said bearing structures being arranged in said tube adjacent and above said unit and the other in the recess of said hub, said other bearing structure having a single row of anti-friction bearings arranged in a common plane transverse to the axis of said shaft.

2. An electric motor driven unit comprising a motor comprising a stator and a rotor, an axial hub carrying said rotor, a unit adapted to be driven by said motor and arranged a substantial distance therebelow, a tube fixing said unit with respect to the casing of said motor, said hub being axially recessed in its lower end, said shaft being integral, and two remotely spaced bearing structures for said shaft, forming the sole supporting means for said shaft, one bearing structure being mounted in said tube adjacent said unit and the other bearing structure comprising a thrust bearing and being arranged in the recess in said hub approximately in the center of said motor, said other bearing structure having a single row of anti-friction bearings arranged in a common plane transverse to the axis of said shaft.

3. An electric motor driven unit comprising a motor having a stator and a rotor, an axial hub carried by said rotor, a rigid tube vertically arranged and fixed at its upper end to said motor, a unit adapted to be driven by said motor and fixed to the lower end of said tube a substantial distance below said motor, said hub being axially recessed in its lower end, a shaft connected at its upper end to said hub, a bearing structure carried by said motor stator and surrounding said shaft and constituting a radial and thrust bearing within said recess, said bearing structure comprising an anti-friction bearing having a single set of anti-friction elements lying in a plane perpendicular to the axis of said shaft, a bearing within said tube adjacent to the lower end thereof and above said unit, said shaft projecting through said bearing and being connected to said unit, said two bearings constituting the sole support for said shaft.

PAUL V. HARMON.

References Cited in the file of this patent

UNITED STATES PATENTS

| Number | Name | Date |
| --- | --- | --- |
| 1,263,633 | Zoelly | Apr. 23, 1918 |
| 1,304,299 | Wiard | May 20, 1919 |
| 1,714,484 | Johnson | May 21, 1929 |
| 1,852,807 | Janssen | Apr. 5, 1932 |
| 1,945,010 | Waterbury | Jan. 30, 1934 |
| 2,274,147 | Kelley | Feb. 24, 1942 |
| 2,509,790 | Stephenson | May 30, 1950 |
| 2,525,370 | Pollack | Oct. 10, 1950 |

FOREIGN PATENTS

| Number | Country | Date |
| --- | --- | --- |
| 173,010 | Great Britain | Dec. 12, 1921 |